(12) United States Patent
Arai

(10) Patent No.: US 10,414,213 B2
(45) Date of Patent: Sep. 17, 2019

(54) PNEUMATIC TIRE

(71) Applicant: Sumitomo Rubber Industries, Ltd., Kobe-shi, Hyogo (JP)

(72) Inventor: Hiroshi Arai, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 285 days.

(21) Appl. No.: 15/287,862

(22) Filed: Oct. 7, 2016

(65) Prior Publication Data
US 2017/0120691 A1    May 4, 2017

(30) Foreign Application Priority Data
Oct. 30, 2015 (JP) ................. 2015-214667

(51) Int. Cl.
*B60C 11/13* (2006.01)
*B60C 11/11* (2006.01)
*B60C 11/03* (2006.01)
*B60C 11/12* (2006.01)

(52) U.S. Cl.
CPC ...... *B60C 11/1392* (2013.01); *B60C 11/0304* (2013.01); *B60C 11/0306* (2013.01); *B60C 11/11* (2013.01); *B60C 11/1236* (2013.01); *B60C 11/1307* (2013.01); *B60C 2011/0339* (2013.01); *B60C 2011/1338* (2013.01)

(58) Field of Classification Search
CPC ............ B60C 11/1307; B60C 11/1315; B60C 11/1323; B60C 2011/133; B60C 2011/1338

USPC .................................................... 152/209.21
See application file for complete search history.

(56) References Cited

U.S. PATENT DOCUMENTS

| 2001/0032691 | A1* | 10/2001 | Ohsawa | B60C 11/13 |
|---|---|---|---|---|
| | | | | 152/209.18 |
| 2010/0154953 | A1* | 6/2010 | Kaji | B60C 11/12 |
| | | | | 152/209.21 |
| 2015/0336430 | A1* | 11/2015 | Sueyoshi | B60C 11/0316 |
| | | | | 152/209.24 |
| 2017/0057295 | A1* | 3/2017 | Kageyama | B60C 11/11 |

FOREIGN PATENT DOCUMENTS

| JP | 2013-216118 A | 10/2013 |
|---|---|---|
| WO | WO2015/146823 | * 10/2015 |

* cited by examiner

*Primary Examiner* — Robert C Dye
(74) *Attorney, Agent, or Firm* — Birch, Stewart, Kolasch & Birch, LLP

(57) ABSTRACT

A pneumatic tire includes a tread portion provided with at least one block and a groove adjacent the at least one block. The at least one block includes a main portion with a ground contact surface for coming into contact with a ground and an auxiliary portion located radially inward of the ground contact surface of the main portion and protruding laterally from the main portion. The auxiliary portion includes a first portion extending along in a longitudinal direction of the groove and at least two second portions located radially outward of the first portion and arranged separately from one another in the longitudinal direction of the groove.

9 Claims, 3 Drawing Sheets

PNEUMATIC TIRE

BACKGROUND ART

Field of the Invention

The present invention relates to pneumatic tires, and in particular relates to a pneumatic tire having excellent performance on snow and steering stability on dry road surfaces.

Description of the Related Art

Japanese Unexamined Patent Application Publication No. 2013-216118 has proposed a pneumatic tire which may have excellent snow performance and uneven wear resistance. The pneumatic tire disclosed in the publication includes a block which is surrounded by a groove and which includes a main portion having a ground contact surface and a step-shaped auxiliary portion protruding laterally from the main portion and terminating in the groove.

Unfortunately, in the above mentioned pneumatic tire, when the step-shaped auxiliary portion increases in length, the snow performance tends to be deteriorated owing to reduction of groove volume despite the fact that the steering stability on dry road surfaces improves. Furthermore, in the above mentioned pneumatic tire, when the step-shaped auxiliary portion decreases in length, the steering stability on dry surfaces tends to be deteriorated owing to reduction in rigidity of the block despite the fact that the snow performance improves.

SUMMARY OF THE INVENTION

In view of the above problems in the conventional art, the present invention has an object to provide a pneumatic tire capable of improving both of snow performance and steering stability on dry road surfaces at a high level.

In one aspect of the invention, a pneumatic tire includes a tread portion provided with at least one block and a groove adjacent the at least one block. The at least one block includes a main portion having a ground contact surface for coming into contact with a ground and an auxiliary portion located radially inward of the ground contact surface of the main portion and protruding laterally from the main portion. The auxiliary portion includes a first portion extending along in a longitudinal direction of the groove and at least two second portions located radially outward of the first portion and arranged separately from one another in the longitudinal direction of the groove.

In another aspect of the invention, the first portion may protrude from the main portion at a first length, and each of the second portions may protrude from the main portion at a second length smaller than the first length.

In another aspect of the invention, one of the second portions may be arranged on a first end side of the first portion and another one of the second portions may be arranged on a second end side of the first portion.

In another aspect of the invention, the at least two second portions may consist of two second portions.

In another aspect of the invention, the main portion may be provided with a first sipe having an opening end communicated with an edge of the ground contact surface of the main portion, and the opening end of the first sipe may be located between two second portions in a plan view of the block.

DESCRIPTION OF THE PREFERRED EMBODIMENTS

Figure 1:
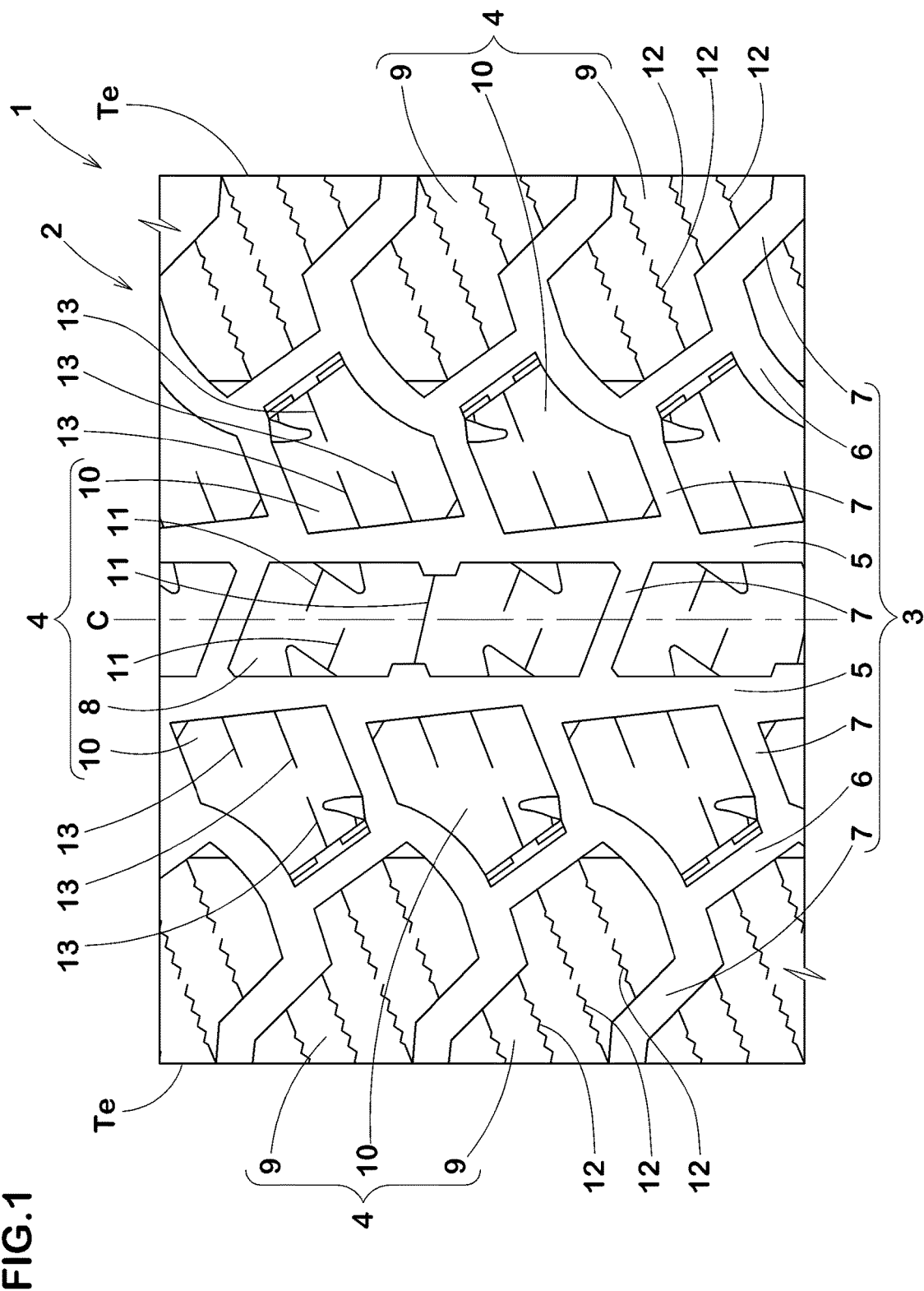
FIG. 1 is a development view of a tread portion of a pneumatic tire according to an embodiment of the present invention.

An embodiment of the present invention will be explained below with reference to the accompanying drawings. FIG. 1 illustrates a development view of a tread portion 2 of a pneumatic tire 1 according to an embodiment of the present invention. The tire 1 according to the present embodiment, for example, may preferably be embodied as a tire for passenger cars. As illustrated in FIG. 1, the tire 1 includes the tread portion 2 provided with a plurality of grooves 3 and at least one block 4 surrounded by one or more grooves 3.

In this embodiment, the grooves 3, for example, include a pair of crown main grooves 5, a pair of shoulder main grooves 6 and a plurality of lateral grooves 7. Preferably, each of the grooves 3 has a width not less than 1.5 mm and a depth D (illustrated in FIG. 3) of from 12 to 18 mm when the tire 1 is under a standard state.

The standard state of the tire is such that the tire 1 is mounted on a standard wheel rim with a standard pressure, but is loaded with no tire load. In this application including specification and claims, various dimensions, positions and the like of the tire refer to those under the standard state of the tire unless otherwise noted. Furthermore, each width of the grooves 3 should be measured perpendicular to the longitudinal direction of each groove unless otherwise noted.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example. In case of passenger car tire, however, the standard pressure is uniformly defined as 180 kPa.

The pair of crown main grooves 5, for example, are disposed such that the tire equator C is located therebetween, and extend in the circumferential direction of the tire in a straight manner. Each of the shoulder main grooves 6, for example, is disposed on the side of a respective one of tread edges Te, and extends in the circumferential direction of the tire in a zigzag manner. The lateral grooves 7 extend in the axial direction of the tire at any one of locations between crown main grooves 5 and 5, between adjacent crown main groove 5 and shoulder main groove 6, and between adjacent shoulder main groove 6 and tread-edge Te.

As used herein, the tread edges Te refer to axially outermost edges of the ground contacting patch of the tread portion 2 which occurs under the standard state with a standard tire load when the camber angle of the tire is zero.

As used herein, the standard tire load is a tire load officially approved or recommended for the tire by standards organizations, wherein the standard load is the "maximum load capacity" in JATMA, the "Load Capacity" in ETRTO, and the maximum value given in the above-mentioned table in TRA or the like. In case of passenger car tires, however, the standard tire load is uniformly defined as 88% of the maximum tire load.

The at least one block 4, for example, includes crown blocks 8, shoulder blocks 9 and middle blocks 10 arranged between the crown blocks 8 and the shoulder blocks 9.

Each of the crown blocks 8, for example, is divided by a pair of crown main grooves 5 and lateral grooves 7, and is arranged on the tire equator C. Preferably, each of the crown blocks 8 is provided with one or more crown sipes 11 extending in a straight manner on its ground contact surface. Preferably, the crown sipes 11 have widths of not more than 1.0 mm and depths in a range of from 3 to 10 mm.

The shoulder blocks 9, for example, are arranged axially outward of each of the shoulder main grooves 6, and are divided by one of the shoulder main groove 7 and lateral grooves 7. Preferably, each of the shoulder blocks 9 is provided with one or more shoulder sipes 12 extending in a zigzag manner on its ground contact surface. Preferably, the shoulder sipes 12 have widths of not more than 1.0 mm and depths in a range of from 3 to 10 mm.

The middle blocks 10, for example, are divided by one of crown main grooves 5, one of shoulder main grooves 6 and lateral grooves 7. Preferably, each of the middle blocks 10 is provided with one or more middle sipe 13 extending in a straight manner on its ground contact surface 14A (illustrated in FIG. 2). Preferably, the middle sipes 13 have widths of not more than 1.0 mm and depths d (illustrated in FIG. 3) in a range of from 3 to 10 mm.

The sipes 11, 12 and 13 can improve snow performance of the tire 1 since they optimize rigidity of each of the blocks 4 so as to improve snow-removing performance from the grooves effectively. Note that the configuration of each of the sipes 11, 12 and 13 is not limited to the above aspect.

Figure 2:
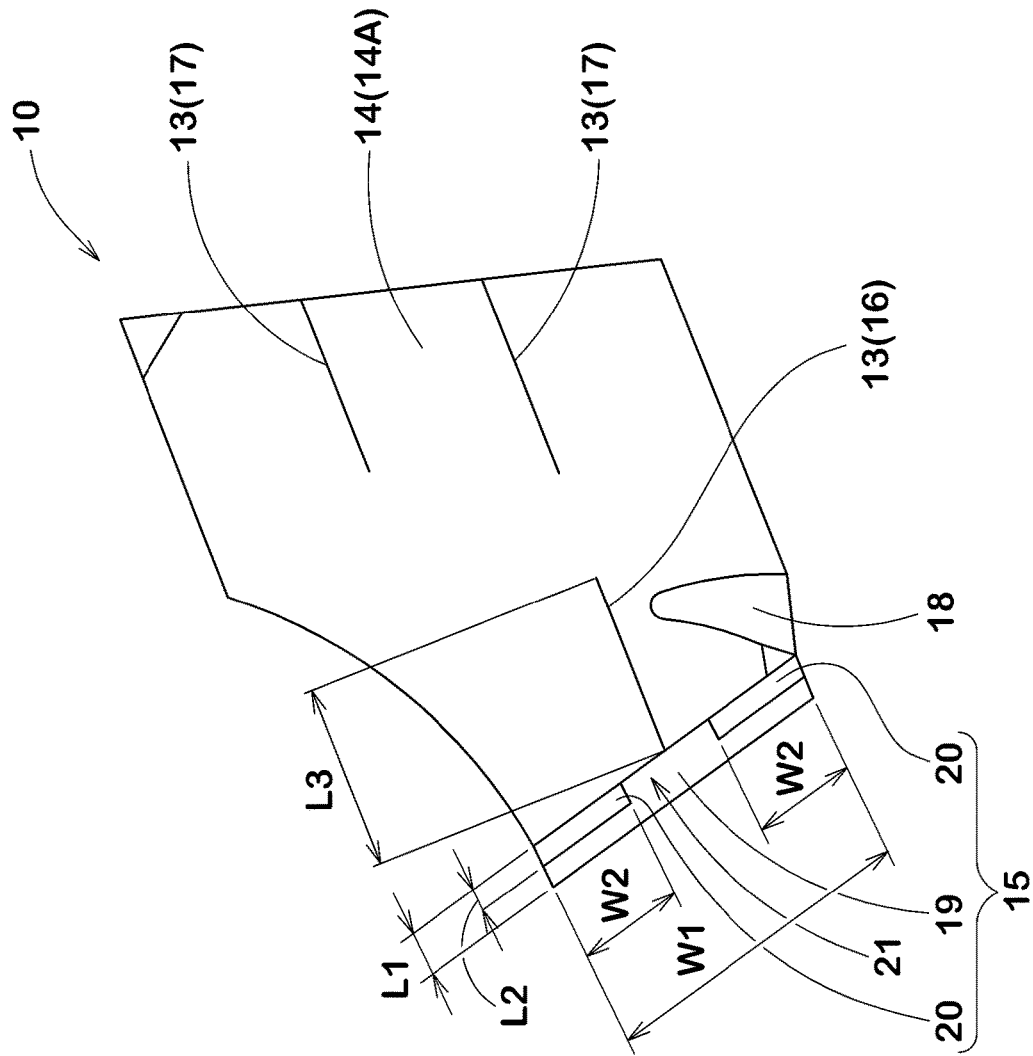
FIG. 2 is a partial enlarged view of a block illustrated in FIG. 1.

FIG. 2 illustrates a partial enlarged view of one of the middle blocks 10. As illustrated in FIG. 2, the middle block 10 includes a main portion 14 having a ground contact surface 14A and an auxiliary portion 15 that is located radially inward of the ground contact surface 14A and protrudes laterally from the main portion 14 so as to terminate with in one of the grooves 3.

Preferably, the ground contact surface 14A of the main portion 14 has substantially polygonal shape.

Each of the sides of the polygonal shape, i.e., each of the edges surrounding the ground contact surface 14A is preferably inclines at a certain angle with respect to both of the axial and circumferential directions of the tire. These edges may increase snow-shearing force with respect to both of the axial and circumferential directions of the tire to improve snow performance of the tire 1. In this embodiment, the ground contact surface 14A, for example, includes one edge formed in an arc shape manner. Note that the shape of the ground contact surface 14A of the main portion 14 is not limited to the above specific aspect.

Preferably, the main portion 14 is provided with a recess 18 communicated with one of the edges of the ground contact surface 14A. In this embodiment, the recess 18 is communicated with the edge which is adjacent one of the lateral grooves 7 (illustrated in FIG. 1) and extends in the circumferential direction of the tire. The recess 18 may increase traction and braking force on snow so that the snow performance of the tire improves.

Figure 3:
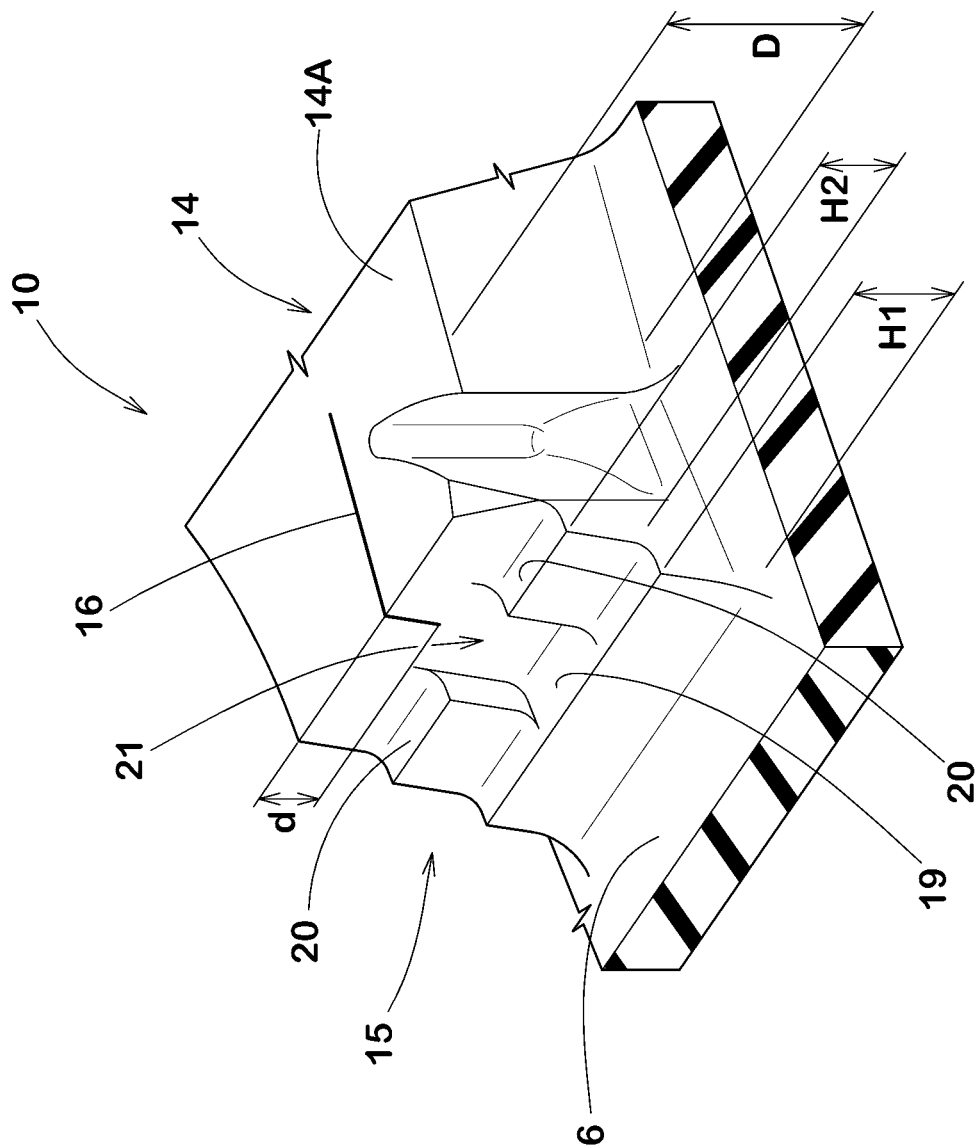
FIG. 3 is a partial perspective view of a block illustrated in FIG. 1.

FIG. 3 illustrates a partial perspective view of one of the middle blocks 10. As illustrated in FIG. 3, the auxiliary portion 15 of the middle block 10, for example, protrudes axially outwardly from the main portion 14 toward the shoulder main grooves 6. The auxiliary portion 15, for example, includes a first portion 19 extending along in the longitudinal direction of the shoulder main groove 6 and at least two second portions 20 located radially outward of the first portion 19 and arranged separately from one another in the longitudinal direction of the shoulder main groove 6.

In this embodiment, two second portions 20 and 20 are provided on each middle block 10 so as to form a dented portion 21 therebetween. Preferably, one of the second portions 20 is arranged on a first end side of the first portion 19 and the other one of the second portions 20 is arranged on a second end side of the first portion 20. The second portions 20 may increase rigidity of the main portion 14 effectively and improve steering stability of the tire 1 on dry surfaces. Furthermore, since the dented portion 21 between the second portions 20 and 20 can generate large snow-shearing force, it further improves snow performance of the tire 1.

Alternatively, the second portions 20 can be provided equal to or more than three on one block, for example. In this case, the second portions 20 are preferably arranged at substantially same intervals.

As illustrated in FIG. 2 or FIG. 3, the first portion 19 according to the present embodiment, for example, protrudes from the main portion 14 toward the shoulder main grooves 6 at a first length L1. Preferably, the first length L1 is in a range of from 20% to 70% the width of the shoulder main grooves 6. When the first length L1 is less than 20% the width of the shoulder main grooves 6, the rigidity of the main portion 19 cannot be enhanced sufficiently and then it may be difficult to improve steering stability on dry surfaces of the tire. While the first length L1 is more than 70% the width of the shoulder main grooves 6, snow performance of the tire may be deteriorated due to reduction of the groove volume.

The first portion 19, for example, is raised from the bottom of the shoulder main grooves 6 at a first height H1. Preferably, the first height H1 may be set in a range of from 30% to 60% the depth D of the shoulder main grooves 6. When the first height H1 is less than 30% the depth D, it may be difficult to improve steering stability of the tire 1 on dry surfaces since rigidity of the main portion 14 is not enhanced sufficiently. When the first height H1 is more than 60% the depth D, snow performance of the tire 1 may be deteriorated due to reduction of the groove volume.

The first portion 19 has a first width W1 which is a width measured along the longitudinal direction of the shoulder main groove 6. Preferably, the first width W1 is in a range of not less than 70% the edge length of the ground contact surface 14A of the main portion 14 on the side of which the auxiliary portion 15 is provided. When the first width W1 is less than 70% the edge length, it may be difficult to improve steering stability of the tire 1 on dry surfaces since rigidity of the main portion 14 is not enhanced sufficiently. More preferably, the first width W1 may be set substantially equal to the edge length.

Each of the second portions 20, for example, protrudes from the main portion 14 toward the shoulder main grooves 6 at a second length L2. Preferably, the second length L2 is smaller than the first length L1, and is in a range of from 40% to 90% the first length L1, for example. When the second length L2 is less than 40% the first length L1, it may be difficult to improve steering stability of the tire 1 on dry surfaces since rigidity of the main portion 14 is not enhanced sufficiently. When the second length L2 is more than 90% the first length L1, snow performance of the tire 1 may be deteriorated due to reduction of the groove volume.

Each of the second portions 20, for example, is raised from the top surface of the first portion 19 at a second height H2. Preferably, total height (H1+H2) of the first height H1 and the second height H2 is in a range of from 50% to 90% the depth D of the shoulder main grooves 6. When the total height (H1+H2) is less than 50% the depth D, it may be difficult to improve steering stability of the tire 1 on dry surfaces since rigidity of the main portion 14 is not enhanced sufficiently. When the total height (H1+H2) is more than 90% the depth D, snow performance of the tire 1 may be deteriorated due to reduction of the groove volume.

Each of the second portions 20 has a second width W2 which is a width measured along the longitudinal direction of the shoulder main grooves 6. Preferably, the second width W2 is in a range of from 10% to 30% the first width W1. In case that the second portions 20 consist of two second portions 20, total width (ΣW2) of the respective second widths W2 is preferably in a range of from 20% to 60% the first width W1. When the total width (ΣW2) is less than 20% the first width W1, it may be difficult to improve steering stability of the tire 1 on dry surfaces since the rigidity of the main portion 14 is not enhanced sufficiently. When the total width (ΣW2) is more than 60% the first width W1, snow performance of the tire 1 may be deteriorated due to reduction of the groove volume.

In this embodiment, the second portions 20 are identical with each other regarding the second length L2, the second height H2 and the second width W2. Alternatively, the second portions 20 may have different configuration from each other.

As illustrated in FIG. 2, preferably, the middle sipes 13 provided on the ground contact surface 14A of each main portion 14 include at least one first middle sipe 16 and at least one second middle sipe 17. The first middle sipe 16 has an opening end that is communicated with the edge of the ground contact surface 14A of the main portion on the side of which the auxiliary portion 15 is provided. The at least one second middle sipe 17 has an opening end that is communicated with the edge of the ground contact surface 14A on the side of which the auxiliary portion 15 is not provided. In this embodiment, one first middle sipe 16 and two second middle sipes 17 are provided on each main portion 14, for example.

As illustrated in FIG. 2 and FIG. 3, in a plan view of the tread portion, the opening end of the first middle sipe 16 is preferably located between two second portions 20 and 20, i.e., the opening end opens at the dented portion 21. The first middle sipe 16 may improve snow performance of the tire 1 since the sipe 16 optimizes the rigidity of the main portion 14 so that snow can be removed from grooves easily. Furthermore, since the opening end of the first middle sipe 16 is surrounded by two second portions 20 and 20, steering stability of the tire can be improved without excessive reduction in rigidity of the main portion 14.

Preferably, the depth (d) of the first middle sipe 16 is in a range of from 20% to 60% the depth D of the shoulder main groove 6. Preferably, the length L3 of the first middle sipe 16 on the ground contact surface 14A is in a range of from 2 to 5 times the depth (d) of the first middle sipe 16. Such a first middle sipe 16 can improve both of steering stability of the tire on dry surfaces and snow performance at a high level.

While the particularly preferable embodiments in accordance with the present invention have been described in detail, the present invention is not limited to the illustrated embodiments, but can be modified and carried out in various aspects.

Example

Pneumatic tires for passenger cars having a basic tread pattern as illustrated in FIG. 1 were manufactured based on the details shown in Table 1, and then steering stability on dry surfaces and snow performance of each tire was tested. The common specifications of the tires and the test methods are as follows.
Tire seize: 265/65R17
Internal Pressure: 180 kPa
Steering Stability Test:

Each test tire was installed to a passenger vehicle and then a driver drove the vehicle on a dry asphalt test course to evaluate steering stability by his feeling. The test results are indicated using a score based on Ref. 1 being 100. The larger the value, the better the performance is.
Snow Performance Test:

Each test tire was installed to a passenger vehicle and then a driver drove the vehicle on a snow road test course to measure necessary time for accelerating to a certain speed from a stop state. The test results are indicated using an index in such a manner that the larger value means the better performance, wherein Ref. 1 is set to 100.

Test results are shown in Table 1. From the test results, it is confirmed that the example tires improve steering stability on dry surfaces and the snow performance in good balance as compared with the tire of Ref. 1.

TABLE 1

|  | Ref. 1 | Ref. 2 | Ex. 1 | Ex. 2 | Ex. 3 |
|---|---|---|---|---|---|
| Number of second portions per block (pieces) | 0 | 1 | 2 | 2 | 2 |
| Ratio (L2/L1) of lengths L2 to L1 (%) | — | 70 | 70 | 30 | 100 |
| Ratio (H1 + H2)/D of total height (H1 + H2) to depth (D) (%) | — | 70 | 70 | 70 | 70 |
| Ratio (Σ W2/W1) of total width (Σ W2) to width W1 (%) | — | 100 | 40 | 40 | 40 |
| Steering stability on dry surfaces (score) | 100 | 130 | 120 | 105 | 130 |
| Snow performance (index) | 100 | 70 | 110 | 115 | 95 |

|  | Ex. 4 | Ex. 5 | Ex. 6 | Ex. 7 | Ex. 8 |
|---|---|---|---|---|---|
| Number of second portions per block (pieces) | 2 | 2 | 2 | 2 | 3 |
| Ratio (L2/L1) of lengths L2 to L1 (%) | 70 | 70 | 70 | 70 | 70 |
| Ratio (H1 + H2)/D of total height (H1 + H2) to depth (D) (%) | 40 | 100 | 70 | 70 | 70 |
| Ratio (Σ W2/W1) of total width (Σ W2) to width W1 (%) | 40 | 40 | 10 | 70 | 45 |
| Steering stability on dry surfaces (score) | 110 | 130 | 110 | 125 | 115 |
| Snow performance (index) | 115 | 90 | 110 | 90 | 100 |

What is claimed is:

1. A pneumatic tire comprising:
   a tread portion provided with at least one block and a groove adjacent the at least one block;
   the at least one block comprising a main portion having a ground contact surface for coming into contact with a ground and an auxiliary portion located radially inward of the ground contact surface of the main portion and protruding laterally from the main portion; and
   the auxiliary portion comprising a first portion extending along in a longitudinal direction of the groove and only two second portions located radially outward of the first portion and arranged separately from one another in the longitudinal direction of the groove, wherein the groove is a shoulder main groove arranged proximate to a tread edge and extending in a tire circumferential direction, the auxiliary portion protrudes in the shoulder main groove so as to form a part of a groove wall of the shoulder main groove, and the first portion has a first height from a groove bottom of the shoulder main groove, each of the second portions has a second height from a top surface of the first portion, and a total height of the first height and the second height is in a range of from 50% to 90% of a groove depth of the shoulder main groove.

2. The pneumatic tire according to claim 1, wherein the first portion protrudes from the main portion at a first length, and each of the second portions protrudes from the main portion at a second length smaller than the first length.

3. The pneumatic tire according to claim 2, wherein the second length is in a range of from 40% to 90% of the first length.

4. The pneumatic tire according to claim 1, wherein one of the second portions is arranged on a first end side of the first portion and another one of the second portions is arranged on a second end side of the first portion.

5. The pneumatic tire according to claim 1, wherein the main portion is provided with a first sipe having an opening end communicated with an edge of the ground contact surface of the main portion, and the opening end of the first sipe is located between two second portions in a plan view of the block.

6. The pneumatic tire according to claim 1, wherein the first portion extends over an entire length of the auxiliary portion in the longitudinal direction of the groove.

7. The pneumatic tire according to claim 1, wherein the first portion protrudes from the main portion at a first length, and the first length is in a range of from 20% to 70% of a groove width of the shoulder main groove.

8. The pneumatic tire according to claim 1, wherein the first portion has a first height from a groove bottom of the shoulder main groove, and the first height is in a range of from 30% to 60% of a groove depth of the shoulder main groove.

9. The pneumatic tire according to claim 1, wherein the first portion has a first width measured along the longitudinal direction of the groove, each of the second portions has a second width measured along the longitudinal direction of the groove, and the second width is in a range of from 10% to 30% of the first width.

* * * * *